(12) United States Patent
Gill et al.

(10) Patent No.: US 12,521,221 B2
(45) Date of Patent: Jan. 13, 2026

(54) INTRA-RUMINAL DEVICE

(71) Applicants: ARGENTA INNOVATION LIMITED, Auckland (NZ); ARGENTA MANUFACTURING LIMITED, Auckland (NZ)

(72) Inventors: David Anthony Gill, Auckland (NZ); Desmond Ian John Morrow, Auckland (NZ); Brendon Shane Rout, Auckland (NZ); Michael Sean Venning, Auckland (NZ)

(73) Assignees: Argenta Innovation Limited, Auckland (NZ); Argenta Manufacturing Limited, Auckland (NZ)

(*) Notice: Subject to any disclaimer, the term of this patent is extended or adjusted under 35 U.S.C. 154(b) by 1085 days.

(21) Appl. No.: 16/975,697

(22) PCT Filed: Feb. 26, 2019

(86) PCT No.: PCT/NZ2019/050019
§ 371 (c)(1),
(2) Date: Aug. 25, 2020

(87) PCT Pub. No.: WO2019/164410
PCT Pub. Date: Aug. 29, 2019

(65) Prior Publication Data
US 2021/0000580 A1    Jan. 7, 2021

(30) Foreign Application Priority Data
Feb. 26, 2018 (NZ) .......................... 740247

(51) Int. Cl.
*A61D 7/00*    (2006.01)
*A61M 25/04*    (2006.01)
(Continued)

(52) U.S. Cl.
CPC ............... *A61D 7/00* (2013.01); *A61M 25/04* (2013.01); *A61M 31/002* (2013.01); *B29C 65/08* (2013.01);
(Continued)

(58) Field of Classification Search
CPC ........ B29C 65/08–088; B29C 66/5344; A61M 2210/1053; A61M 31/002; A61M 2205/0255; A61M 2207/00; A61K 9/0068
See application file for complete search history.

(56) References Cited

U.S. PATENT DOCUMENTS 4,281,763 A * 8/1981 Pace ....................... A61J 3/072
                                                          220/8
D271,623 S    11/1983 Simpson et al.
(Continued)

FOREIGN PATENT DOCUMENTS

EP    398663    11/1990
GB    2152373 A *  8/1985    ........... A61K 9/0068
(Continued)

*Primary Examiner* — Bhisma Mehta
*Assistant Examiner* — Adam J. Cermak
(74) *Attorney, Agent, or Firm* — Bryan Cave Leighton Paisner LLP (57) ABSTRACT

An intra-ruminal device including a cap, with outlet, that overlaps a portion of a barrel to define an attachment zone. Located within the attachment zone is at least one protrusion providing a localised point of contact between the barrel wall and the internal sidewall of the cap to provide for an ultrasonic weld between the barrel and the cap. Optionally the device includes a plunger, and the plunger optionally includes at least one aperture to allow fluid or gas communication between first and second compartments in the barrel. Optionally included are at least one pair of resilient wings, the wings having a pair of reinforcement ridge that extend a first distance from the body along the wing surface, and at least one middle reinforcement ridge that extends (Continued)

between the pair of ridges from the body a second distance, and where the second distance is less than the first distance.

20 Claims, 3 Drawing Sheets

(51) Int. Cl.
  *A61M 31/00* (2006.01)
  *B29C 65/00* (2006.01)
  *B29C 65/08* (2006.01)
  *B29L 31/00* (2006.01)
(52) U.S. Cl.
  CPC .......... *B29C 66/5344* (2013.01); *B29C 66/71* (2013.01); *A61M 2205/0255* (2013.01); *A61M 2207/00* (2013.01); *A61M 2210/1053* (2013.01); *A61M 2250/00* (2013.01); *B29L 2031/753* (2013.01)

(56) References Cited

U.S. PATENT DOCUMENTS

| | | | | |
|---|---|---|---|---|
| 4,416,659 A * | 11/1983 | Simpson | A61D 7/00 | 604/48 |
| 4,883,484 A * | 11/1989 | Shepherd | A61K 9/0068 | 424/438 |
| 4,886,181 A * | 12/1989 | Haines | B29C 65/72 | 220/613 |
| 5,277,912 A * | 1/1994 | Lowe | A61K 9/0068 | 604/890.1 |
| 5,456,679 A * | 10/1995 | Balaban | A61M 5/14526 | 604/890.1 |
| 5,465,856 A * | 11/1995 | Sheffler | B29C 66/12842 | 220/613 |
| 5,620,113 A * | 4/1997 | Meshberg | B05B 11/026 | 222/1 |
| 5,728,088 A * | 3/1998 | Magruder | A61M 31/002 | 604/890.1 |
| 5,823,383 A * | 10/1998 | Hins | B29C 66/30223 | 215/44 |
| 5,861,072 A * | 1/1999 | Medal | F16B 37/122 | 264/445 |
| 8,734,430 B2 * | 5/2014 | Holmes | A61K 9/0068 | 424/422 |
| 2003/0212386 A1 * | 11/2003 | Trompen | A61K 9/0068 | 424/422 |
| 2005/0004706 A1 * | 1/2005 | Osborne | B65B 7/161 | 604/110 |
| 2010/0140271 A1 * | 6/2010 | Benedetti | B29C 65/561 | 220/361 |
| 2012/0123394 A1 * | 5/2012 | Holmes | A61K 9/0068 | 604/891.1 |
| 2013/0140316 A1 * | 6/2013 | Flowers | B29C 66/12463 | 220/592.2 |
| 2013/0244487 A1 * | 9/2013 | Van Swearingen | B23K 20/129 | 439/583 |
| 2015/0129110 A1 * | 5/2015 | Klinstein | B29C 66/542 | 156/73.1 |
| 2015/0307235 A1 * | 10/2015 | Docherty | B29C 65/7841 | 383/42 |
| 2016/0138641 A1 * | 5/2016 | Dobbin | B29C 66/342 | 156/308.2 |
| 2017/0311644 A1 * | 11/2017 | Collett | A24F 40/70 | |
| 2018/0222647 A1 * | 8/2018 | Geier | B65B 83/425 | |
| 2019/0329950 A1 * | 10/2019 | Totterman | B65D 23/0842 | |
| 2021/0002062 A1 * | 1/2021 | Jasper | B29C 66/112 | |
| 2021/0361919 A1 * | 11/2021 | Langer | A61B 5/6861 | |

FOREIGN PATENT DOCUMENTS

| | | | | |
|---|---|---|---|---|
| NZ | 769171 A * | 5/2025 | | A61K 9/0068 |
| NZ | 769172 A * | 5/2025 | | A61K 9/0068 |
| WO | 1982-000094 | 1/1982 | | |
| WO | 1989/006943 A1 | 8/1989 | | |
| WO | 2011-014078 | 2/2011 | | |

* cited by examiner

INTRA-RUMINAL DEVICE

This application is a U.S. National Stage Application of International Application No. PCT/NZ2019/050019 filed on Feb. 26, 2019, which claims priority to and the benefit of priority of New Zealand Patent Application No. 740247 filed on Feb. 26, 2018, all of which are hereby incorporated by reference in their entirety for all purposes as if fully set forth herein.

FIELD OF THE INVENTION

The present invention relates to an improved intra-ruminal device and method of making the device. In particular, the invention relates to an apparatus and method to improve the structural integrity of an intra-ruminal device and prevent the separation of various components of the device during and after use.

BACKGROUND TO THE INVENTION

An intra-ruminal controlled release device is a delivery device designed to provide therapeutic agents to the rumen over extended periods. To ensure the device performs as intended, certain Critical Quality Attributes (CQAs) must be met.

CQAs include such requirements as (1) to keep the device intact so that the therapeutic agent is only exposed at an orifice, (2) to prevent damage to the rumen by individual components of the device (e.g. spring), and (3) to ensure the device remains in situ for the entire pay-out period.

In conventional devices, the separation of device components within the rumen and/or after regurgitation remains a problem. This is undesirable as internal separation of components may result in internal dose dumps, leading to toxicity to the animal and/or physical safety issues. Separation of the device following regurgitation, such as if the device is crushed, could lead to other safety and environmental issues.

The efficacy of some conventional devices also continues to be limited due to pressure build-up inside the device leading to uncontrolled and inconsistent dosing.

It is an object of the present invention to address one or more of the abovementioned issues, and/or to provide an improved intra-ruminal device and/or to at least provide the public with a useful choice.

SUMMARY OF THE INVENTION

In a first aspect the present invention relates to an intra-ruminal device comprising:
- an elongate body or body assembly substantially impervious to rumen fluids, the body defining a barrel having a first end and a second end, and an opening at the first end,
- at least one variable geometry device dependent from the body to assist rumen retention,
- a dose of an active agent within the body to be accessible to rumen fluid via the first end,
- a biasing arrangement within the body adapted to bias the active agent in the barrel towards the first end, and
- a cap having a sidewall and top, the cap located over the opening at the first end and comprising an outlet in the top, the sidewalls of the cap overlap a portion of the barrel to define an attachment zone, and located within the attachment zone is at least one protrusion providing a localised point of contact between the barrel wall and the internal sidewall of the cap to provide for an ultrasonic weld between the barrel and the cap at the attachment zone.

In a further aspect the present invention relates to an intra-ruminal device comprising:
- an elongate body or body assembly substantially impervious to rumen fluids, the body defining a barrel having a first end and a second end, and an opening at the first end,
- at least one variable geometry device dependent from the body to assist rumen retention, the variable geometry device defined by at least one pair of resilient wings extending outwardly from the end of the body distal to the first end, each pair of wings having a pair of reinforcement ridge that extend a first distance from the body along the wing surface, and at least one middle reinforcement ridge that extends between the pair of ridges from the body a second distance, and where the second distance is less than the first distance,
- a dose of an active agent within the body to be accessible to rumen fluid via the first end,
- a biasing arrangement within the body adapted to bias the active agent in the barrel towards the first end, and
- a cap having a sidewall and top, the cap located over the opening at the first end and comprising an outlet in the top.

In a further aspect the present invention relates to an intra-ruminal device comprising:
- an elongate body or body assembly substantially impervious to rumen fluids, the body defining a barrel having a first end and a second end, and an opening at the first end,
- at least one variable geometry device dependent from the body to assist rumen retention,
- a dose of an active agent within the body to be accessible to rumen fluid via the first end,
- a biasing arrangement within the body adapted to bias the active agent in the barrel towards the first end, and a cap having a sidewall and top, the cap located over the opening at the first end and comprising an outlet in the top; and
- wherein the device comprises
  i) a cap having sidewalls that overlap a portion of the barrel to define an attachment zone, and located within the attachment zone is at least one protrusion providing a localised point of contact between the barrel wall and the internal sidewall of the cap to provide for an ultrasonic weld between the barrel and the cap at the attachment zone, or
  ii) a plunger located in the barrel to define a first compartment holding the active agent between the plunger and the first end, and a second compartment between the plunger and the second end, the plunger comprising at least one aperture to allow fluid or gas communication between the first and second compartments, or
  iii) a variable geometry device defined by at least one pair of resilient wings extending outwardly from the end of the body distal to the first end, each pair of wings having a pair of reinforcement ridge that extend a first distance from the body along the wing surface, and at least one middle reinforcement ridge that extends between the pair of ridges from the body a second distance, and where the second distance is less than the first distance, or
  iv) a combination of any two or more of (i) to (iii).

In a further aspect the present invention relates to a method of assembling an intra-ruminal device, the method comprising:
    providing an intra-ruminal device comprising:
        an elongate body or body assembly substantially impervious to rumen fluids, the body defining a barrel having a first end and a second end, and an opening at the first end,
        at least one variable geometry device dependent from the body to assist rumen retention,
        a dose of an active agent within the body to be accessible to rumen fluid via the first end,
        a biasing arrangement within the body adapted to bias the active agent in the barrel towards the first end,
    loading the active agent into the barrel,
    attaching a cap located over the opening at the first end, the cap comprising an outlet in the top and having sidewalls that overlap a portion of the barrel to define an attachment zone, and located within the attachment zone is at least one protrusion providing a localised point of contact between the barrel wall and the internal sidewall of the cap,
    subjecting the attachment zone to ultrasonic vibrations to produce frictional heat energy at the protrusion to form a weld between the protrusion at its contact surface.

In a further aspect the present invention relates to the use of an intra-ruminal device as described above in a ruminant.

The following embodiments may relate to any of the above aspects.

Preferably the intra-ruminal device comprises a plurality of protrusions.

Preferably the protrusions are in the same plane.

Alternately, the protrusions are in different, yet adjacent, planes.

In one embodiment the protrusions are formed contiguously about the perimeter.

In some embodiments the protrusions are
    i) located on the outer surface of the barrel in the attachment zone,
    ii) on the inner surface of the cap side wall, or
    iii) both (i) and (ii).

Preferably the at least one protrusion in cross section is triangular or trapezoidal.

Preferably a portion of the inner surface of the cap sidewall comprises a notch, into which extends a protrusion from the outer wall of the barrel to contact the surface of the notch.

Preferably the thickness of the barrel wall adjacent the attachment zone is thickened.

Preferably the thickening of the barrel side wall is to substantially match the thickness of the cap sidewall.

Preferably at least one protrusion mates with a substantially flat surface of the corresponding wall surface.

Preferably the plunger comprises multiple apertures.

Preferably the diameter of the aperture is about 2.0, 2.2, 2.4, 2.6, 2.8, 3.0, 3.2, 3.4, 3.6, 3.8 or 4.0 mm, and suitable ranges may be selected from between any of these values.

Preferably the device comprises a neck, from which the reinforcement ridges radiate therefrom, connected to the body at the second end.

Preferably a wing comprises three zones, a first zone located adjacent the neck, the flexible zone located at the distal end of the wing, and a second zone located between the first and flexible zones, the total thickness of the wings being first zone>second zone>flexible zone.

Preferably the pair of reinforcement ridges are located substantially within the first and second zones, and the middle reinforcement ridge is substantially located in the first zone.

Figure 7:
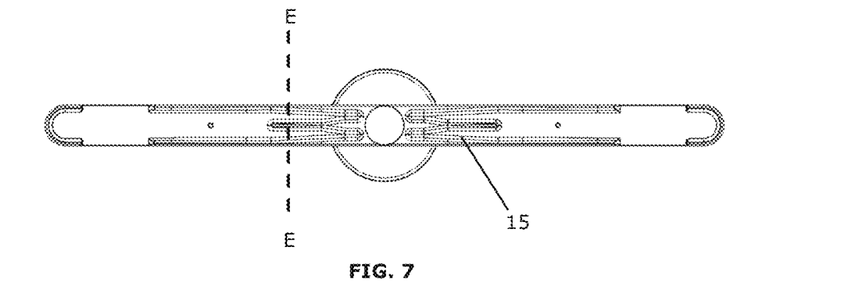
FIG. 7 is a top view of the device, showing the top of the wing, and dashed line E - - - E shows the cross-section of the wing through zone 1, which is illustrated in FIG. 8.
Figure 8:
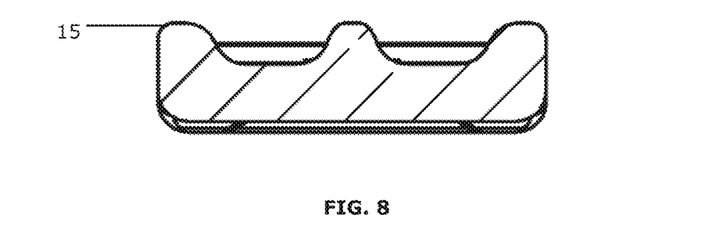
FIG. 8 is a cross-sectional view of the wing through zone 1 at line E - - - E in FIG. 7, when viewed looking from the wing tip towards the barrel.
Figure 9:
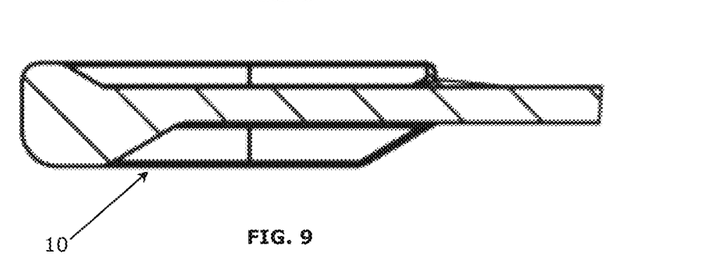
FIG. 9 shows the cushioning zone of the wing.

Preferably distal to the flexible zone 9 is a cushioning zone 10 as shown in FIGS. 7 and 9, wherein the cushioning zone is defined by an increase in the total thickness of the wing at least about the perimeter of the cushioning zone.

Preferably the flexible zone thickness is between about 20, 21, 22, 23, 24, 25, 26, 27, 28, 29, 30, 31, 32, 33, 34 or 35% of the wing thickness at the first zone, and suitable ranges may be selected from between any of these values.

Preferably the flexible zone thickness is between about 40, 42, 44, 46, 48, 50, 52, 54, 56, 58 or 60% of the wing thickness at the second zone, and suitable ranges may be selected from between any of these values.

Preferably the wing at the flexible zone is flexible.

Preferably the thickness of the ridges is about 30 to about 60% of the total thickness of the wing (i.e. including the ridges).

Preferably the thickness of the ridges is about 65 to about 90% of the wing thickness (i.e. excluding the ridges).

Preferably the primary direction of the ultrasonic vibrations are substantially perpendicular to the cap sidewall.

Preferably the body and the cap are held together under heat and pressure.

Preferably the intra-ruminal device is used in a group or herd of ruminants, each ruminant being administered an intra-ruminal device, and wherein the cap remains on the barrel of the intra-ruminal device for the duration of the administration period.

Preferably the intra-ruminal device is used in a group or herd of ruminants, each ruminant being administered an intra-ruminal device, and wherein the variable retention means remain attached to the body for the duration of the active agent payout period.

Preferably the variable geometry retention means are designed to separate from the body after the payout period.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.)

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

The invention will now be described by way of example only and with reference to the drawings in which.

DETAILED DESCRIPTION OF THE INVENTION

The present invention relates to an intra-ruminal device that comprises an elongate body or body assembly substantially impervious to rumen fluids. The body defines a barrel having a first end and a second end, with an opening at the first end. The device includes at least one variable geometry device dependent from the body to assist rumen retention. Within the body is a dose of an active agent accessible to rumen fluid via the first end. Also within the body is a biasing arrangement that is adapted to bias the active agent in the barrel towards the first end. When assembled, the device includes a cap having a sidewall and top, the cap located over the opening at the first end and comprising an outlet in the top. Preferably, the barrel comprises a flared portion towards the first end of the device. The device may additionally comprise a cap. Preferably, in an assembled condition, the cap 4 is in contact with the flared portion. Preferably, the cap 4 comprises sidewalls that contact at least a portion of the barrel to define an attachment zone. Prior to assembly of the device, located within the attachment zone is at least one protrusion providing a localised point of contact between the barrel wall and the internal sidewall of the cap to provide for an ultrasonic weld between the barrel and the cap at the attachment zone.

The device may additional comprise a plunger located in the barrel to define a first compartment holding the active agent between the plunger and the first end, and a second compartment between the plunger and the second end, the plunger comprising at least one aperture to allow fluid or gas communication between the first and second compartments. The device may additionally comprise a variable geometry device defined by at least one pair of resilient wings extending outwardly from the end of the body distal to the first end, each pair of wings having at least one reinforcement ridge.

A benefit of an intra-ruminal device of the present invention include improved structural integrity.

The device of the invention may be used to deliver one or more active ingredients to a non-human animal, preferably a ruminant animal, such as for example cattle, goats, sheep, deer, yaks and giraffes, preferably cattle or sheep.

1. Intra-Ruminal Device Body

The body of the intra-ruminal device is formed of a material that is substantially impervious to rumen fluids. So called "Laby devices" (named after the inventor Ralph Laby), operate on the basis that the medicament in the barrel is exposed to the ruminal fluid at the orifice, or aperture end of the device only. As the medicaments typically swell upon exposure to ruminal fluid, swelling of the medicament in the barrel at locations other than at the orifice or aperture end may alter the operation of the device.

Figure 1:
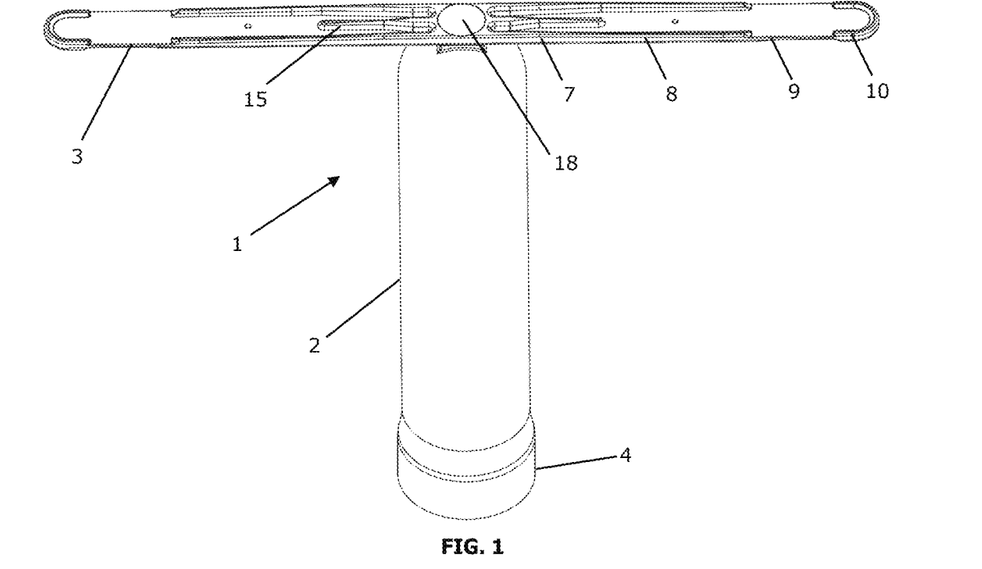
FIG. 1 is a perspective view of an intra-ruminal device of the present invention (plunger not shown).

As shown in FIG. 1, the body of the intra-ruminal device 1 defines a barrel 2 having a first end and a second end, and an opening at the first end. The second end is typically sealed. Preferably, the first end of the barrel 2, comprises projections 5. Preferably, the projections 5 are located on an outer surface of the barrel.

A Laby device is typified by having a biasing mechanism within the barrel that urges the plunger towards the first end, maintaining the medicament in the barrel at the orifice or aperture at the first end.

Preferably the intra-ruminal device is adapted for continuous or sequential release of the active agent or agents via the cap aperture, reliant on a column of matrices (i.e. tablets), at least some of which contain the active agent or agents. The active agent or agents are released into the animal in a controlled manner by contact of matrices with intra-ruminal fluid via the cap orifice or aperture thereby allowing erosion or dissolution of the matrices into the animal.

The biasing arrangement is located within the body distal to the active agents, and involves some form of biasing mechanism such as a spring and plunger, to urge the active agent or agents to the outlet end. Other mechanisms may be used such as the use of gas to create pressure on the plunger or electrical mechanical means.

The intra-ruminal device includes a variable geometry device 3 to ensure retention in the rumen. Ruminants typically regurgitate their food as part of the digestive process, and without a retention mechanism the device can be ejected from the animal.

The body of the intra-ruminal device may be formed into a number of suitable shapes that are able to be administered via the animal's esophagus. Preferably the body of the intra-ruminal device is cylindrically shaped, and preferably the cross section of the body is circular.

In various embodiments, the at least one outlet may be located at one end of the body. The outlet may be from about 1, 2, 3, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22 mm or more in diameter, and useful ranges may be selected in between any of these values (for example from about 3 to about 20 mm, or from about 4 to about 18.5 mm in diameter). It will be understood by a person skilled in the art that the size of the outlets will depend on factors such as for example, the intended payout rate.

Preferably one or both ends of the body may taper in to a reduced diameter to aid the passage of the intra-ruminal device down the oesophagus to the rumen.

The diameter of the body of the intra-ruminal device 1 is small enough to pass down the oesophagus of a ruminant animal with ease and large enough to accommodate one or more matrices in the barrel. The diameter of the barrel 2 depends on, for example the thickness of the body of the intra-ruminal device. In some embodiments the diameter of the intra-ruminal device 1 and the diameter of the barrel 2 may be very similar, the difference being the result of the thickness of the body.

In some embodiments the diameter of the intra-ruminal device may be less than about 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9 or 4 cm, and useful ranges may be selected from any of these values (for example the diameter of the intra-ruminal device may be from about 1 to about 4 cm, or from about 1.2 to about 3.5 cm).

The length of the body of the device can vary to, for example, accommodate more or less matrices. The length of the body may also vary depending on, for example, the animal to which the intra-ruminal device will be administered the size of the animal, the dose and pay-out period and may be from about 70, 75, 80, 85, 90, 95, 100, 105, 110, 115, 120, 125, 130, 135, 140, 145, 150, 155, 160, 165, 170 mm or more, and useful ranges may be selected from any of these values (for example from about 70 mm to about 170 mm, or from about 75 mm to about 165 mm). For example in some embodiments the length of the body of an intra-ruminal device to be administered to sheep and other small ruminants may be from about 76 mm to about 83 mm, and the length of the body of the intra-ruminal device to be administered to cattle and other similar-sized ruminants may be from about 97 to about 162 mm.

Biasing Arrangement

The intra-ruminal device 1 comprises a biasing arrangement located in the barrel 2 of the device 1 within the body, and is adapted to bias the active agent or agents in the barrel to the outlet at the first end of the barrel. In some embodiments, the biasing arrangement may comprise a plunger 12 and biasing means, the plunger 12 defining a space within the barrel between the plunger and the closed end of the barrel. In various embodiments, the biasing means may comprise one or more springs, gas inflation, or electrical mechanical means.

In some embodiments, the biasing means, such as a spring, may be made of materials such as alloys of steel, for example stainless steel, carbon steel, oil tempered wire, chrome silicon steel or chrome vanadium steel. Other alloys may also be used, for example Inconel, Monel, beryllium, copper or phosphor bronze. Other suitable materials will be apparent to those skilled in the art.

In various embodiments the biasing arrangement may be adapted to be extendible to at least about 45, 50, 55, 60, 65, 70, 75, 80, 85, 90, 95 or 100% of the length of the body, and suitable ranges may be selected from any of these values (for example from about 45% to about 100%, or from about 80% to about 100%).

In exemplary embodiments the biasing arrangement may comprise a spring that is adapted to push a plunger to extend the biasing arrangement to at least about 80, 85, 90, 95 or 100% of the length of the body.

Without wishing to be bound by theory the inventors believe the pressure exerted by the biasing arrangement, that is, the pressure biasing the active agent or agents towards the at least one outlet contributes to control of the payout period.

In various embodiments the pressure exerted by the compression arrangement, for example the biasing means such as a spring, may remain substantially constant for the entire payout period.

A number of factors can affect the function of the compression arrangement, and these must be tightly controlled to achieve constant, consistent and reliable payout of the one or more active ingredients in the barrel. For example, in conventional devices the permeability of gasses may be compromised, leading to the formation of a partial vacuum in the space between part of the biasing arrangement, for example the plunger of the biasing arrangement, and the closed end of the barrel. This can then lead to inconsistent payout.

In some embodiments the intra-ruminal device 1 of the invention may comprise a biasing arrangement in which part of the biasing arrangement comprises at least one aperture 13.

Plunger

In various embodiments the biasing arrangement comprises a plunger 12 and a biasing means, for example one or more springs.

The plunger 12 contacts the inner wall surface of the barrel to substantially form a seal within the barrel.

Figure 10:
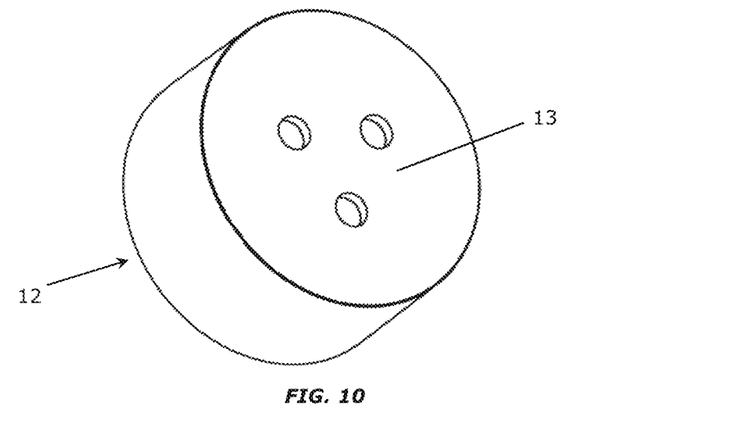
FIG. 10 is a perspective view of a plunger of the present invention.

In an alternate embodiment, as shown, e.g., in FIG. 10, the plunger 12 comprises at least one aperture 13 providing a gas and/or fluid communication between the space within the barrel defined by the plunger and the closed end (the second compartment). The aperture 13 in the plunger 12 is configured to prevent pressure build up in the barrel 2 of the intra-ruminal device 1.

In some embodiments the plunger 12 may comprise at least 1, 2, 3, 4 or 5 apertures and useful ranges may be selected from any of these values, (for example 1 to about 5, about 1 to about 4, about 1 to about 3, about 2 to about 5, about 2 to about 5, about 2 to about 3, about 3 to about 5, about 4 to about 5 apertures).

The diameter of the one or more apertures will depend on factors such as for example, the number of apertures present, as will be apparent to a person skilled in the art. In some embodiments the diameter of the apertures may be from about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0 mm or more and useful ranges may be selected from any of these values (for example from about 0.5 to about 6 mm, from about 0.5 to about 4.0 mm, or from about 1.0 to about 4.0 mm).

Variable Geometry Retention Means

In various embodiments, the retention means may comprise a variable geometry device, preferably a retractable resilient wing or wings, preferably on one end of the body. The retention mechanism assists rumen retention by preventing regurgitation of the intra-ruminal device 1.

Preferably, the resilient wing 3 comprises an extended position and a retracted position.

Figures 2, 3:
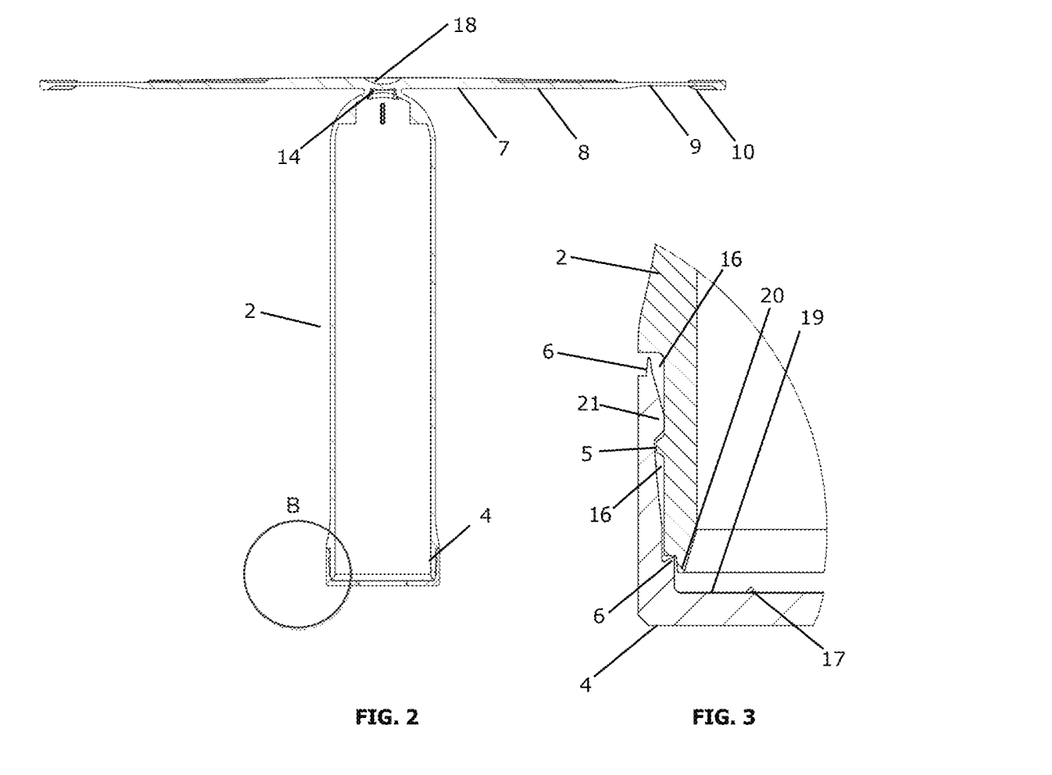
FIG. 2 is a cross-sectional view of an intra-ruminal device of the present invention showing the attachment of a cap to the barrel.
FIG. 3 is a partial cross-sectional view showing the attachment of a cap to the barrel in a pre-weld condition.
Figure 4:
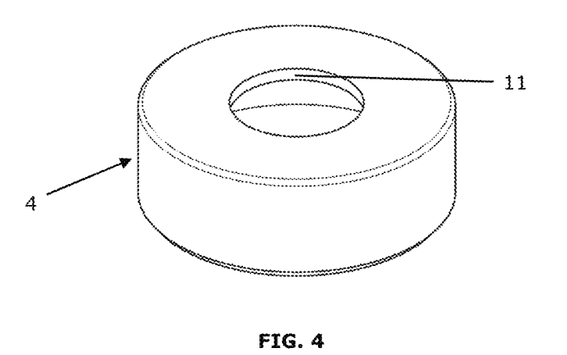
FIG. 4 is a perspective view of the cap.

Preferably the resilient wing 3 is in an extended position when no force is applied to the wings 3 as shown in FIGS. 1 and 2. In the extended the position the wings extend outwardly from the end of the body distal to the outlet (second end).

Preferably the resilient wing 3 transitions from an extended position to a retracted position when a force is applied to a top surface of the wings 3, such as when the intra-ruminal device 1 is being administered into an internal cavity of an animal. As a force is applied to the top surface of the wings 3, the variable geometry device, preferably the wings 3 are pressed against the side of the body. The intra-ruminal device 1 returns to an extended position after administration to prevent regurgitation. In some embodiments the intra-ruminal device may comprise more than one retention means, for example a variable geometry device such as a wing or pair of wings and a weighted component.

In the preferred embodiment, the intra-ruminal device 1 comprises a neck portion 14. Preferably, the neck portion 14 spaces the wings 3 from the second end of the barrel 2. As the wings 3 are pressed against the side of the body, in a retracted position, the neck portion 14 preferably prevents the proximal end of the wings 3 from contacting the second end of the barrel 2. Spacing the wings 3 from the second end of the barrel 2 may improve the range of wing flexing, as the second end of the barrel does not inhibit the range of motion of the wings 3.

In some embodiments the height of the neck portion 14 may be from about 0.05, 0.1, 0.15, 0.2. 0.25, 0.3, 0.35, 0.4, 0.45, 0.5 mm, and useful ranges may be selected from any of these values (for example the height of the neck portion 14 may be from about 0.05 to about 0.2 mm, or from about 0.15 to about 0.3 mm). Preferably, the height of the neck portion 14 spaces the wings 3 from the second end of the barrel 2, while rigidly providing sufficient support to the wings.

In some embodiments the width of the neck portion 14 may be between 15% and 50% of the width of the barrel 2. In the preferred embodiment, the width of the neck portion 14 is between 20% and 30% of the width of the barrel. Preferably, the width of the neck portion 14 sufficiently supports the wings, and has no or limited interference on the transition of the wings 3 between an extended position and a retracted position.

The variable geometry device, for example wings, may be pressed against the side of the body using a number of means. For example, water soluble tape or adhesive may be used to hold the wings against the body.

In some embodiments the variable geometry device, for example wings may be pressed against the side of the body using a pharmaceutical grade polymer or co-polymer that is readily dissolved by the contents of the rumen or using a polymer or co-polymer that melts at the temperature of the rumen, for example a polymer that melts at a temperature of from about 37.5, 38, 39, 39.5, 40, 40.5 or 41° C., and useful ranges may be selected from any of these values (for example from about 39 to about 40° C., or from about 38 to about 41° C.). Preferably the melting point of the polymer or co-polymer is from about 38.5 to about 40.5° C. to avoid the polymer melting in the oesophagus of the ruminant and releasing the wings from the side of the body before the device enters the rumen.

In some embodiments the variable geometry device, for example wings may be made from the same polymeric material as the body, or they may be made from a different polymeric material. In various embodiments the variable geometry device, for example wings may be made of a polymeric material that is less rigid than the polymer used to make the body, to allow the wings to be retained against the side of the body during administration to an animal. Suitable polymeric materials will be apparent to a person skilled in the art and may include for example any pharmaceutical grade polymers that are sufficiently pliable to be held against the side of the intra-ruminal device when administered. In various embodiments the wings or part of the wings may be made of polypropylene or a co-polymer thereof.

In some embodiments the width of the wing or wings may vary along the length of the wing.

In various embodiments the width of the wing may decrease from the end of the wing closest to the body to the end of the wing furthest from the body.

In various embodiments the width of the wing may be substantially constant from the end of the wing closest to the body up to a point, and then may decrease from the point to the end of the wing furthest from the body.

Preferably, about a peak force of about 100, about 150, about 200, about 250, about 300, about 350, about 400, about 450, about 500, about 550, about 600, about 650, about 700, about 750 or 800 g is required to bend the flexible zone 9 and displace it by approximately 5 mm, about and useful ranges may be selected from any of these values (for example, from about 100 to about 800, about 100 to about 700, about 100 to about 500, about 100 to about 400. 200 to about 800, about 200 to about 750, about 200 to about 55 to about, about 200 to about 450, about 250 to about 800, about 250 to about 600, about 300 to about 800, about 300 to about 700, about 300 to about 600, about 350 to about 800, about 350 to about 650, about 350 to about 550, about 400 to about 800, about 400 to about 700, about 450 to about 800, about 450 to about 700 g).

Preferably, the peak force required to bend the second zone 8 is greater than the peak force required to bend the flexible zone 9.

Preferably, the peak force required to bend the second zone 8 is about 3, 4, 5, 6, 7, or 8 times the peak force required to bend the flexible zone 9, and useful ranges may be selected from any of these values (for example, 3 to about 8, about 3 to about 7, about 3 to about 5, about 3 to about 8, about 3 to about 7, about 3 to about 6, about 4 to about 8, about 4 to about 7, about 4 to about 6, about 5 to about 8 times).

Preferably, a peak force of about 1300, 1400, 1500, 1600, 1700, 1800, 1900, 2000, 2100, 2200, 2300, 2400, 2500, 2600, 2700, 2800, or 2900 g is required to bend the second zone 8 and displace it by approximately 5 mm, and useful ranges may be selected from any of these values (for example, 1300 to about 2900, about 1300 to about 2700, about 1300 to about 2500, about 1300 to about 2000, about 1400 to about 2900, about 1400 to about 2500, about 1400 to about 2200, about 1500 to about 2900, about 1500 to about 2700, about 1500 to about 2400, about 1500 to about 2200, about 1600 to about 2900, about 1600 to about 2600, about 1600 to about 2400, about 1600 to about 2000, about 1800 to about 2900, about 1800-2600, about 1900 to about 2900, about 1900 to about 2700, about 1900 to about 2600 g).

Preferably, the peak force required to bend the first zone 7 is greater than the peak force required to bend the flexible zone 9.

Preferably, the peak force required to bend the first zone 7 is greater than the peak force required to bend the second zone 8.

Preferably, the peak force required to bend the first zone 7 is 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1 or 3.2 times the peak force required to bend the second zone, and useful ranges may be selected from any of these values (for example, 1.3 to about 3.2, about 1.3 to about 2.9, about 1.3 to about 2.6, about 1.3 to about 2.4, about 1.4 to about 2.9, about 1.4 to about 2.7, about 1.4 to about 2.5, about 1.4 to about 2, about 1.5 to about 2.9, about 1.5 to about 2.7, about 1.5 to about 2.5, about 1.5 to about 2.2, about 1.6 to about 2.9, about 1.6 to about 2.6, about 1.6 to about 2.2, about 1.6 to about 2.0, about 1.7 to about 2.9, about 1.7 to about 2.6, about 1.7 to about 2.2, about 1.8 to about 2.9, about 1.8 to about 2.5, about 2.8 to about 2.4, about 1.9 to about 2.9, about 1.9 to about 2.7, about 1.9 to about 1.5, about 2.0 to about 2.9 times).

Preferably, a peak force of about 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400 or 5500 g is required to bend the second zone 8 and displace it by approximately 5 mm, and useful ranges may be selected from any of these values (for example, 3100 to about 5500, about 3100 to about 5000, about 3100 to about 4800, about 3100 to about 4500, about 3100 to about 4200, about 3300 to about 5500, about 3300 to about 5000, about 3300 to about 4800, about 3300 to about 4500, about 3300 to about 4200, about 3300 to about 4000, about 3500 to about 5500, about 3500 to about 5000, about 3500 to about 4800, about 3500 to about 4500, about 3900 to about 5500, about 3900 to about 5100, about 3900 to about 4900 g)

Preferably, altering the polymeric composition can result in slight changes, however, the relative flexibility of the various zones remain substantially the same.

Wing Zones

As shown in FIG. 2 the wing 3 comprises three zones, a first zone 7 located adjacent the neck 14, the flexible zone 9 located at the distal end of the wing, and a second zone 8 located between the first and flexible zones.

Preferably, the total thickness of the wings 3 gradually decreases towards the distal end of the wings. An advantage of varying thicknesses of the wings 3, is to provide the desired flexibility and strength properties at different zones of the wings.

In the preferred configuration the first zone is thicker than the second zone, and the second zone is thicker than the flexible zone (i.e. first zone thickness>second zone>flexible zone). Preferably, the wings 3 are more rigid at the thicker (proximal) zones of the wings, while the thinner (distal) zones are relatively more flexible.

The thinner wing profile allows the wing at the flexible zone 9 to be flexible. The thinner wing profile allows the wing to flex at or close to the flexible zone.

As shown in FIG. 2, preferably the transition between the second zone 8 and the flexible zone 9 is an inclined plane. An advantage of a smooth transition between the second zone 8 and the flexible zone 9, is to spread the stress zone along the wings 3. Spreading the stresses along the wings 3, may improve the durability of the intra-ruminal device 1. In contrast, a sharp transition between the second zone 8 and the flexible zone 9 may result in concentrated stress at the transition between zones.

Preferably distal to the flexible zone 9 is a cushioning zone 10. Preferably, the cushioning zone 10 is defined by an increase in the total thickness of the wing, relative to the flexible zone 9 of the wings 3 as shown in a partial cross section in FIG. 9.

Preferably, the distal end of the wings 3 are rounded to prevent or reduce damage to the animal as the intra-ruminal device 1 is being inserted or when it is the rumen.

Reinforcement Ridges

In the preferred configurations, the intra-ruminal device 1 comprises at least one reinforcement ridge 15 as best shown in FIGS. 1 and 7. Preferably, the width of the reinforcement ridge 15 is less than the width of the wings 3. An advantage of the reinforcement ridges 15 is its ability to strengthen the wings 3 and spread stresses over a greater area on the wings. The reinforcement ridges 15 preferably spreads a force, such as one which is applied onto a surface of the wings 3 during administering of device, over a greater area of wings.

In the preferred configuration, the reinforcement ridges are located substantially along or parallel to the longitudinal wing axis. Preferably, the reinforcement ridges 15 radiate from a proximal end of the wings 3 towards a distal end of the wings.

In preferred configuration, the reinforcement ridges 15 are of the same material as the wings 3. In various embodiments the reinforcement ridges 15 are made of a polymeric material that is stable under the conditions present in the rumen of the animal. Preferably, the reinforcement ridges 15 are co-formed with the wings 3.

In another configuration, the reinforcement ridges 15 are formed separately and adhered to the wings 3. Optionally, the reinforcement ridges 15 are of a different material to the wings 3, to form a composite reinforced wing 3 with desired physical properties such as strength and flexibility.

The intra-ruminal device 1 comprises a first reinforcement ridge 15. Preferably, the first reinforcement ridge 15 is a pair of reinforcement ridges. Preferably, the first pair of ridges are located along the periphery of the wings 3.

In the preferred configuration, as shown in FIGS. 1 and 7, the intra-ruminal device 1 comprises a second reinforcement ridge 15. Preferably, the second reinforcement ridge 15 is located along the longitudinal axis of the wings 3. Optionally, the second reinforcement ridge is a pair of reinforcement ridges (not shown).

The first reinforcement ridge 15 extends a first distance from the body along a wing surface. In the preferred configuration, the second reinforcement ridge extends from the body a second distance. In one configuration, the second distance is less than the first distance. In another configuration, the second distance is greater than the first distance.

In preferred configuration, the first reinforcement ridge is located substantially within the first 7 and second 8 zones. In the preferred configuration, the second reinforcement ridge is located substantially within the first zone 7.

In another configuration, the first reinforcement ridge is located substantially within the first zone 7. Optionally, the second reinforcement ridge is located substantially within the first 7 and second 8 zones.

In the preferred configuration, the reinforcement ridges 15 do not extend along the flexible zone 9.

Preferably, the reinforcement ridges 15 are located on a surface of the wings 3. In the preferred configuration, the reinforcement ridges 15 are located on the top surface of the wings 3. In another configuration the reinforcement ridges 15 are located on the bottom surface of the wings 3. Optionally, in one configuration, reinforcement ridges 15 are located on both the top surface and the bottom surface of the wings 3.

In the preferred configuration, the cushioning zone 10 is thicker at least partially around the perimeter of the cushioning zone 10 as shown in FIGS. 1 and 7.

Preferably the flexible zone thickness is between about 20, 21, 22, 23, 24, 25, 26, 27, 28, 29, 30, 31, 32, 33, 34 or 35% of the wing thickness at the first zone, and suitable ranges may be selected from between any of these values.

Preferably the flexible zone thickness is between about 40, 42, 44, 46, 48, 50, 52, 54, 56, 58 or 60% of the wing thickness at the second zone, and suitable ranges may be selected from between any of these values.

Preferably, the flexible zone 9 is located substantially towards the distal end of the wing. This allows the wing to flex at its distal ends preventing or reducing damage to the rumen.

Preferably the thickness of the ridges is about 30 to about 60% of the total thickness of the wing (i.e. including the ridges).

Preferably the thickness of the ridges is about 65 to about 90% of the wing thickness (i.e. excluding the ridges).

Wing Cavity

In some embodiments, the intra-ruminal device 1 comprises a wing cavity 18 on the top surface of the wings 3 as shown in FIGS. 1 and 2. The wing cavity 18 preferably strengthens the wings 3 and spread stresses over a greater area on the wings to improve durability of the device.

Preferably, the wing cavity 18 is located at the proximal end of the wings 3. Preferably, the wing cavity 18 is located substantially in the centre of the top surface of the wings 3. In the preferred configuration, the wing cavity 18 is circular. Preferably, the base of the wing cavity 18 is on a plane lower than the top surface of the wings 3.

In some embodiments, the body, and the variable geometry device, for example the wing(s) of the intra-ruminal device may be manufactured from one or more parts moulded from plastic materials (e.g. polypropylene) and may be fabricated together by adhesive and/or welding, preferably ultrasonic welding.

Matrix

In various embodiments, the barrel of the intra-ruminal device may comprise at least one active-containing matrix comprising at least one active ingredient.

The at least one matrix may be any shape adapted to fit inside the barrel of the device. In various embodiments, the barrel of the intra-ruminal device may comprise more than one matrix. The form of the matrix may be for example a tablet, a capsule, a caplet or a wafer. In some embodiments, the one or more matrices may be shaped to allow them to align axially with respect to one another along the longitudinal axis of the body of the intra-ruminal device, such that they are sequentially presentable to the rumen, as originally proposed in the Laby device. Preferably the at least one matrix is a tablet, preferably disc-shaped.

In some embodiments the diameter of the one or more matrices may be less than about 9, 10, 11, 12, 13, 14, 15, 16, 17, 18, 19, 20, 21, 22, 23, 24, 25, 26, 27, 28, 29, 30, 31, 32, 33, 34, 35 mm, and useful ranges may be selected from any of these values (for example the diameter of the matrices may be from about 10 to about 35 mm, or from about 11 to about 32 mm). For example in some embodiments one or more matrices for use in intra-ruminal devices to be administered to sheep may be from about 11 to about 15 mm in diameter and one or more matrices for use in intra-ruminal devices to be administered to cows may be from about 15 to about 32 mm in diameter.

The diameter of the one or more matrices comprising the one or more active ingredients must be such that the diameter is small enough to fit into the barrel of the device. For example if the diameter of the barrel of the device is 20 mm, then the matrix may have a diameter of for example around 18 mm.

In some embodiments the device may comprise a plurality of matrices, for example a plurality of tablets, the number of matrices depending on the length of the body of the device and the thickness of the matrix. For example in some embodiments the thickness of the matrices may be from at least about 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75 or 10 mm or more, and useful ranges may be selected between any of these values, for example from about 3 to about 9 mm, or from about 7 to about 9 mm.

In some embodiments the barrel may comprise one matrix only, for example one solid core comprising at least one active ingredient and optionally one or more excipients. In such embodiments the matrix may substantially span the length of the barrel from the biasing arrangement to end of the body comprising the at least one outlet.

In some embodiments, the active ingredient(s) may be released into the rumen in a controlled manner by contact of the composition comprising the active ingredient(s) with the intra-ruminal fluid allowing erosion or dissolution of the composition into the rumen.

In some embodiments, a seal exists between the rumen-facing end of the matrix comprising the active ingredient(s) and the barrel of the intra-ruminal device. In various embodiments the part of the compression arrangement, for example the plunger, contacts an inner wall surface of the barrel to substantially form a seal within the barrel. Without wishing to be bound by theory the inventors believe that an ineffective seal between the barrel and rumen-facing end of the matrix comprising the active ingredient(s) may allow other surfaces of the matrix or other matrices in the stack to swell, adversely affecting, or stopping reliable payout of the medication.'

Active Ingredients

The one or more matrices of the present invention deliver a therapeutic quantity of one or more active ingredients. The active ingredient(s) are delivered from an intra-ruminal device and may be absorbed in to the systematic circulation.

A wide range of active ingredients may be delivered from the at least one matrix in the intra-ruminal devices of the present invention.

In some embodiments the one or more matrices may comprise one or more antibiotics, antifungals, antivirals, steroid hormones, antihistamines, metabolic regulators, productivity regulators, corticosteroids, antiemetics, anti-thyroidal agents, parasiticidal agents, such as for example anthelmintics, nutritional actives or a combination thereof.

In some embodiments the one or more matrices may comprise one or more vitamins, for example vitamin A, vitamin E, vitamin $B_{12}$, vitamin $B_3$, d-pantothenic acid (vitamin $B_5$), folic acid, vitamin $B_6$, vitamin $B_1$, vitamin $D_3$, vitamin C, vitamin $B_2$. As another example, the nutritional active could be a pro-vitamin, for example beta-carotene or panthenol.

In some embodiments the nutritional active may be an amino acid. Suitable amino acids include but are not limited to the 20 naturally occurring L-amino acids, for example arginine, isoleucine, leucine, lysine, etc.

In some embodiments the nutritional active may be a co-enzyme, for example co-enzyme Q.

In some embodiments the nutritional active may be a mineral. Non-limiting examples of minerals include potassium, sodium, manganese, zinc, iron, calcium, copper, cobalt, iodine, chlorine and selenium. In some embodiments the mineral may be in the form of a suitable salt.

In some embodiments the one or more matrices may comprise one or more anti-microbial ingredients for example antibiotics, antifungals, antivirals, anthelmintics, and the like.

Suitable antibiotic agents may be those that act as inhibitors of cell wall synthesis (e.g. penicillins, cephalosporins, bacitracin and vancomycin), inhibitors of protein synthesis (aminoglycosides, macrolides, lincosamides, streptogramins, chloramphenicol, tetracyclines), inhibitors of membrane function (e.g. polymixin B and colistin), inhibitors of nucleic acid synthesis (e.g. quinolones, metronidazole, and rifampin), or inhibitors of other metabolic processes (e.g. anti-metabolites, sulfonamides, and trimethoprim). Non-limiting examples of antibiotics include polyethers, ionophores such as monensin and salinomycin, beta-lactams such as penicillins, aminopenicillins (e.g., amoxicillin, ampicillin, hetacillin, etc.), penicillinase resistant antibiotics (e.g., cloxacillin, dicloxacillin, methicillin, nafcillin, oxacillin, etc.), extended spectrum antibiotics (e.g., axlocillin, carbenicillin, mezlocillin, piperacillin, ticarcillin, etc.); cephalosporins (e.g., cefadroxil, cefazolin, cephalixin, cephalothin, cephapirin, cephradine, cefaclor, cefacmandole, cefmetazole, cefonicid, ceforanide, cefotetan, cefoxitin, cefprozil, cefuroxime, loracarbef, cefixime, cefoperazone, cefotaxime, cefpodoxime, ceftazidime, ceftiofur, ceftizoxime, ceftriaxone, moxalactam, etc.); monobactams such as aztreonam; carbapenems such as imipenem and eropenem; quinolones (e.g., ciprofloxacin, enrofloxacin, difloxacin, orbifloxacin, marbofloxacin, etc.); chloramphenicols (e.g., chloramphenicol, thiamphenicol, florfenicol, etc.); tetracyclines (e.g., chlortetracycline, tetracycline, oxytetracycline, doxycycline, minocycline, etc.); macrolides (e.g., erythromycin, tylosin, tlimicosin, clarithromycin, azithromycin, etc.); lincosamides (e.g., lincomycin, clindamycin, etc.); aminoglycosides (e.g., gentamicin, amikacin, kanamycin, apramycin, tobramycin, neomycin, dihydrostreptomycin, paromomycin, etc.); sulfonamides (e.g., sulfadmethoxine, sfulfamethazine, sulfaquinoxaline, sulfamerazine, sulfathiazole, sulfasalazine, sulfadiazine, sulfabromomethazine, suflaethoxypyridazine, etc.); glycopeptides (e.g., vancomycin, teicoplanin, ramoplanin, and decaplanin; and other antibiotics (e.g., rifampin, nitrofuran, virginiamycin, polymyxins, tobramycin, etc.).

In some embodiments the one or more matrices may comprise one or more antifungal active ingredients for example one or more polyenes, azoles, allylamines, morpholines, antimetabolites, and combinations thereof. For example in some embodiments the matrices of the invention may comprise one or more of fluconazole, itraconazole, clotrimazole, ketoconazole, terbinafine, 5-fluorocytosine, and amphotericin B, or combinations thereof.

Non-limiting examples of antivirals that may be present in the one or more matrices of the invention may include didanosine, lamivudine, stavudine, zidovudine, indinavir, and ritonavir.

In some embodiments the one or more matrices may comprise one or more steroid hormone, for example steroid hormones such as growth promoters and production enhancers. In some embodiments, the steroid hormone may be natural steroid hormone, such as for example estradiol, progesterone, and testosterone, or a synthetic steroid hormone, such as trenbolone acetate, estradiol benzoate, estradiol 17β, and melengestrol acetate, and/or zeranol.

Steroid hormones that may be present in one or more matrices of the invention may comprise for example natural and synthetic steroid hormones, steroid hormone precursors, steroid hormone metabolites, and derivatives thereof that are structurally derived from cholesterol. Steroid hormones may be synthesized from cholesterol via pathways that involve cytochrome P450 (cP450) enzymes, which are heme-containing proteins.

In some embodiments the one or more matrices may comprise one or more steroid hormones such as for example androgens, estrogens, progestogens, mineral corticoids, and glucocorticoids. Exemplary androgens include, but are not limited to, testosterone, dehydroepiandrosterone, dehydroepiandrosterone sulphate, dihydrotestosterone, androstenedione, androstenediol, androstanedione, androstanediol, and any combination thereof. Exemplary estrogens include, but are not limited to, estrone, estradiol, estriol, estetrol, equilin, equilenin, and any combination thereof. Exemplary progestogens include, but are not limited to, progesterone, 17-hydroxy-progesterone, pregnenolone, dihydroprogesterone, allopregnanolone, 17-hydroxy-pregnenolone, 17-hydroxy-dihydroprogesterone, 17-hydroxy-allopregnanolone, and any combination thereof. Exemplary mineralcorticoids include, but are not limited to, aldosterone, 11-deoxycorticosterone, fludrocortisones, 1 1-deoxy-cortisol, pregnenedione, and any combination thereof. Exemplary glucocorticoids, include, but are not limited to, cortisol (hydrocortisone), corticosterone, 18-hydroxy-corticosterone, cortisone, and any combination thereof.

In some embodiments the one or more matrices may comprise one or more anti-histamines, such as for example clemastine, clemastine fumarate (2(R)-[2-[1-(4-chlorophenyl)-1-phenyl-ethoxy]ethyl-1-methylpyrrolidine), dexmedetomidine, doxylamine, loratidine, desloratidine and promethazine, and diphenhydramine, or pharmaceutically acceptable salts, solvates or esters thereof.

In some embodiments one or more matrices may comprise one or more anti-emetics, such as for example phenothiazines (e.g., prochloperazine, promethazine, thiethylperazine, perphenazine, chlorpromazine, metopimazine, acepromazine, etc.); 5HT-3 receptor antagonists such as ondansetron, granisetron, tropisetron, dolasetron, hydrodolasetron, azasetron, ramosetron, lerisetron, indisetron and palonosetron; and others such as dimenhydrinate, diphenhydramine (which can also act as an antihistamine), cyclizine, meclizine, promethazine, hyroxyzine, metoclopramide, domperidone, hyoscine, hyoscine hydrobromide, hyoscine hydrochloride, scopolamine, clebopride, alizapride, itopride, bromopride, droperidol, haloperidol, benzquinamide, cerium oxalate, diphenidol, dronabinol, nabilone, ginger, levosulpiride, butorphanol and aprepitant.

In some embodiments the one or more matrices may comprise one or more metabolic regulators, such as for example one or more methanogens or a hypothyroidism treatment.

In some embodiments the one or more matrices may comprise one or more ingredients to treat hypothyroidism, such as for example, thyroid hormones and derivatives thereof, such as thyroixines such as $T_2$, $T_3$ and $T_4$. "$T_2$" refers to the thyroid hormone iodothyronine or 3,5-diiodo-1-thyronine. "$T_3$" refers to the art recognized thyroid hormone, triiodothyronine (also known as (2S)-2-amino-3-[4-(4-hydroxy-3-iodo-phenoxy)-3,5-diiodo-phenyl]propanoic acid). "$T_4$" refers to the art recognized thyroid hormone, thyroxine, or 3,5,3',5'-tetraiodothyronine (also known as (2S)-2-amino-3-[4-(4-hydroxy-3,5-diiododophenoxy)-3,5-diiodophenyl]propanoic acid).

In some embodiments the one or more matrices may comprise one or more productivity regulators, for example polyethers such as monensin. In some embodiments, the productivity regulator may be a productivity enhancer.

In exemplary embodiments the one or more matrices may comprise one or more anthelmintic agents, for example one or more benzimidazoles, imidazothiazoles, tetrahydropyrimidines, macrocyclic lactones, salicylanilides, substituted phenols, aromatic amides, isoquinolines, amino acetonitriles, spiroindoles, or combinations thereof.

Anthelmintic benzimidazoles comprise for example mebendazole, flubendazole, fenbendazole, oxfendazole, oxibendazole, albendazole, albendazole sulfoxide, thiabendazole, thiophanate, febantel, netobimin, and triclabendazole. Further examples include mebendazole, and ricobendazole.

Without wishing to be bound by theory, the inventors believe that benzimidazole-based anthelmintics may interfere with the worm's energy metabolism on a cellular level by binding to a specific building block called beta tubulin and preventing its incorporation into certain cellular structures called microtubules, which are essential for energy metabolism.

Imidazothiazoles and tetrahydropyrimidines are both nicotinic agonists. In some embodiments the one or more anthelmintic agents in the one or more matrices may comprise imidathiazoles, for example levamisole, tetramisole, and butamisole. Tetrahydropyrimidine anthelmintics that may be used in the matrices of the invention include, for example, morantel, oxantel, and pyrantel.

Without wishing to be bound by theory the inventors believe that tetrahydropyrimidines may mimic the activity of acetylcholine, a naturally occurring neurotransmitter that initiates muscular contraction. This may lead to helminths that are unable to feed and starve.

Without wishing to be bound by theory the inventors believe that imidazothiazoles may have a similar mode of action to tetrahydropyrimidines and may cause spastic paralysis of helminths, For example, levamisole is thought to have a broad spectrum of activity and may therefore be effective against many larval stages of parasites.

In various embodiments the one or more matrices may comprise one or more macrocyclic lactones, for example abamectin, doramectin, eprinomectin, ivermectin, selamectin, milbemycin, for example as milbemycin oxime, moxidectin or a combination thereof.

In some embodiments the one or more matrices may comprise one or more salicylanilides for example brotianide, clioxanide, closantel, niclosamide, oxyclozanide, rafoxanide, substituted phenols including for example bithionol, disophenol, hexachlorophene, niclofolan, menichlopholan, nitroxynil, and aromatic amides, including for example diamfenetide (diamphenethide) or combinations thereof.

In some embodiments the one or more matrices may comprise one or more isoquinoline anthelmintics, such as for example praziquantel and epsiprantel. In some embodiments the matrices of the invention and the intra-ruminal devices may comprise one or more amino-acetonitrile derivatives, such as for example monepantel.

In some embodiments the one or more matrices may comprise one or more active ingredients such as for example piperazine and derivatives thereof such as piperazine and diethylcarbamazine (DEC, a derivative of piperazine), benzenesulfonamides such as clorsulon, amidines such as bunamidine, isothiocyantes such as nitroscanate, and organophosphates such as dichlorvos, and spiroindoles such as derquantel (2-deoxoparaherquamide).

In various embodiments, the one or more active ingredient(s) in the at least one matrix of the intra-ruminal device, is/are stable and does not react with other components in the reaction mixture or degrade or decompose by other means.

In various embodiments, the payout rates of the active ingredient(s) may be measured as a function of the width of a matrix ejected into the rumen through the one or more outlets in the end cap. In some embodiments the payout rate of the intra-ruminal device of the invention may be from about 0.1, 0.125, 0.15, 0.175, 0.2, 0.225, 0.025, 0.275, 0.3, 0.325, 0.35, 0.375, 0.4, 0.425, 0.45, 0.475, 0.500, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95, 0.975, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9 to 3 mm or more per day in water, and suitable ranges may be selected from any of these values, for example from about 0.3 mm to about 2.4 mm, or from about 0.5 mm to about 1.5 mm). Preferably, the payout of the one or more active ingredients is linear and in various embodiments the linearity may be greater than 0.95.

In various embodiments, the payout rates of the one or more active ingredient(s) is/are minimally affected, preferably not affected by the pH and ionic composition of the rumen.

In some embodiments, the one or more matrices of the intra-ruminal device, may comprise more than one active ingredient. For example in some embodiments the matrices of the invention may comprise from 2, 3, 4, 5, 7, 8, 9, or about 10, or more active ingredients, and useful ranges may be selected from any of these values (for example from 2 to about 10 or from 2 to about 5 active ingredients).

In some embodiments the one or more matrices of the intra-ruminal device, may comprise more than one active ingredient, wherein some or all of the active ingredients belong to a different therapeutic class, for example antibiotics, antifungals, antivirals, steroid hormones, antihistamines, metabolic regulators, productivity regulators, corticosteroids, antiemetics, anti-thyroidal agents, parasiticidal agents, such as for example anthelmintics and/or nutritional actives. For example the matrix may comprise 3 actives, one of which is an anthelmintic, one of which is an antibiotic and the third one may be a nutritional active, for example a vitamin.

In various embodiments the one or more matrices of the intra-ruminal device may comprise more than one active ingredient, each of which belongs in the same therapeutic class, preferably anthelminitics. In some embodiments the matrix may comprise two or more anthelmintic actives belonging to the same class of anthelmintics, such as for example benzimidazoles, imidazothiazoles, tetrahydropyrimidines, macrocyclic lactones, salicylanilides, substituted phenols, aromatic amides, isoquinolines, amino acetonitriles and spiroindoles. For example the matrices may comprise two or three actives, each of which may be a macrocyclic lactone.

In various embodiments the one or more matrices of the intra-ruminal device may comprise two or more active ingredients each of which is an anthelmintic active and each belonging to a different anthelmintic class, such as for example benzimidazoles, imidazothiazoles, tetrahydropyrimidines, macrocyclic lactones, salicylanilides, substituted phenols, aromatic amides, isoquinolines, amino acetonitriles and spiroindoles. For example the matrices may comprise two anthelmintics, one of which may be a macrocyclic lactone and the other may be an imidazothiazole.

In some embodiments the one or more matrices may comprise at least about 5, 7.5, 10, 12.5, 15, 17.5, 20, 22.5, 25, 27.5, 30, 32.5, 35, 37.5, 40, 42.5, 45, 47.5, 50, 52.5 or 55% or more of one or more active ingredients by weight of each matrix, and useful ranges may be selected from any of these values (for example from about 8 to about 50% or from about 10 to about 40% by weight of the matrix).

Other Ingredients

The one or more matrices comprising the one or more active ingredients and polymers may further comprise a number of excipients. Examples of suitable excipient may include, but are not limited to fillers, diluents, lubricants, surfactants, glidants, gel formers, binders, and stabilisers, or combinations thereof.

In some embodiments, one or more matrices of the invention may further comprise one or more fillers or diluents. Examples of suitable fillers or diluents may include, but are not limited to, sugars such as for example lactose, sucrose and mannitol, inorganic salts such as calcium phosphate and calcium carbonate, cellulose, methyl cellulose, ethyl cellulose, aluminium silicates such as kaolin or combinations thereof.

In some embodiments the one or more matrices may comprise one or more fillers and/or diluents at amounts of from about 0, 0.1, 0.25, 0.5, 0.75, 1, 2, 3, 4, 5, 6, 7, 8, 9, 10, 12.5, 15, 17.5, 20, 22.5, 25, 27.5, 30, 32.5, 35, 37.5, 40, 42.5, 45, 47.5, 50, 52.5, 55, 57.5, 60, 62.5, 65, 67.5, 70, 72.5, 75, 77.5, 80, 82.5, 85, 87.5, 90, 92.5, 95% by weight of the matrix, and useful ranges may be selected from any of these values (for example from about 0.1 to about 80% by weight or from about 0.1 to about 15% by weight of the matrix).

In some embodiments, the one or more matrices may comprise one or more surfactants or lubricants. Examples of surfactants or lubricants may include, but are not limited to, metal stearates such as for example metal or non-metal stearates such as magnesium stearate, calcium stearate and stearyl fumarate, glyceryl stearates such as for example glyceryl monostearate, glycerine derivatives, sodium lauryl sulfate, sucrose fatty acid ester, mineral clays, and aluminium silicates such as kaolin or combinations thereof.

In some embodiments the one or more surfactants and/or lubricants may be present in the matrices of the invention in an amount of from about 0, 0.01, 0.05, 0.075, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, 55, 60, 65, 70, 75, 80, 85, or 90% by weight of the matrix, and useful ranges may be selected from any of these values (for example from about 0.5 to about 50% or from about 5% to about 40%).

In some embodiments, the one or more matrices may further comprise one or more glidants. Examples of glidants include, but are not limited to, colloidal silica dioxide, talc, metal stearates such as magnesium stearate, calcium stearate and stearyl fumarate, and glyceryl stearates such as glyceryl monostearate, or combinations thereof.

In some embodiments the glidant(s) may be present in the one or more matrices in amounts of from about 0, 0.25, 0.5, 0.75, 1, 1.25, 1.5, 1.75, 2, 2.25, 2.5, 2.75, 3, 3.25, 3.5, 3.75, 4, 4.25, 4.5, 4.75, or 5% by weight of the matrix, and useful ranges may be selected from any of these values (for example from about 0.25 to about 4% or from about 0 to about 2% by weight of the matrix).

In some embodiments, the one or more matrices may comprise one or more additional gel formers. Examples of additional gel formers that may be used include, but are not limited to, sucrose fatty acid ester, cellulosic derivatives such as hydroxyethyl cellulose and hydroxymethyl cellulose, and chitosan, or combinations thereof.

The gel former(s) may be present in the one or more matrices in amounts of from about 0, 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 55, 60, 65, 70, 75, 80, 85 or 90% by weight of the matrix, and useful ranges may be selected from any of these values (for example from about 0.5 to about 80% or from about 1% to about 50% by weight of the matrix).

In some embodiments, the one or more matrices may comprise one or more binders. Examples of binders include, but are not limited to, cellulosic derivatives such as hydroxyethyl cellulose and hydroxymethyl cellulose.

The binder(s) may be present in the one or more matrices of the invention in amounts of from about 0, 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, or 50% by weight of the matrix, and useful ranges may be selected from any of these values (for example From about 0 to about 35% by weight of the matrix.

In some embodiments, the one or more matrices may comprise one or more stabilisers. Examples of stabilisers that may be used in the matrices include, but are not limited to, antioxidants such as for example butylated hydroxytoluene, butylated hydroxyanisol and tocopherol, and buffers.

The stabilisers(s) may be present in the one or more matrices in amounts of from about 0.01, 0.02, 0.03, 0.04, 0.05, 0.06, 0.07, 0.08, 0.09, 0.1, 0.15, 0.2, 0.25, 0.5, 0.75, 1, 1.25, 1.5, 1.75, 2, 2.25, 2.5, 2.75, 3, 3.25, 3.5, 3.75, 4, 4.25, 4.5, 4.75, or 5% by weight of the matrix, and useful ranges may be selected from any of these values (for example from about 0.1 to about 5% or from about 0.5 to about 3.5% by weight of the matrix).

2. Intra-Ruminal Device Cap

The intraluminal device 1 comprises a cap 4 that seals the first end of the device to retain the matrix of active agents within the barrel. The cap encapsulates the end of the barrel, and contains at least one aperture.

Figure 5:
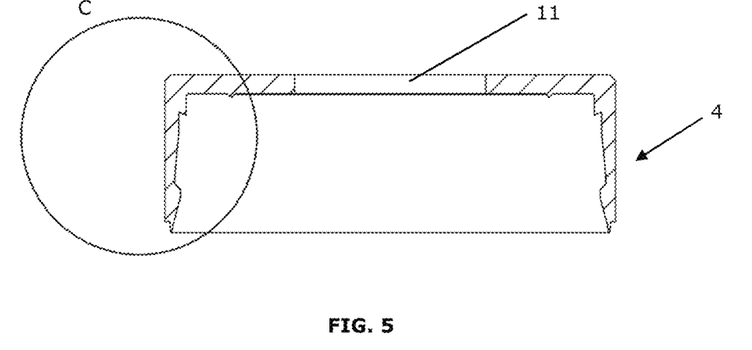
FIG. 5 is a cross-sectional view of the cap showing detail C.
Figure 6:
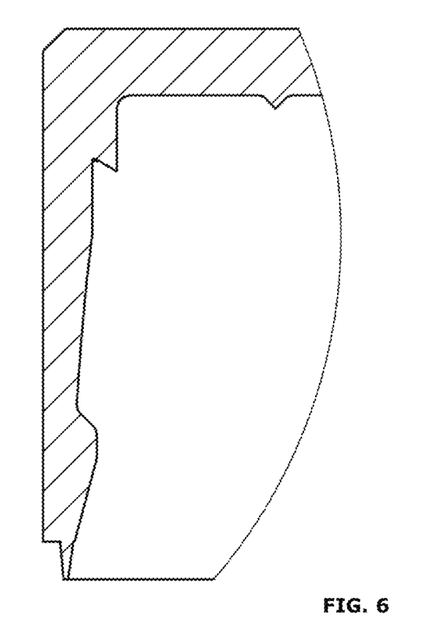
FIG. 6 is an enlargement of detail C from FIG. 5.

In some embodiments, as shown in FIG. 5, the cap 4 comprises sidewalls and a top, the top comprising one or more apertures 11. The sidewalls of the cap 4 at least partially contacts the first end of the barrel to define an attachment zone.

The inventors have found that intra-ruminal devices comprising one or more ultrasonically welded caps show reduced separation of device components within the rumen and after regurgitation.

Without wishing to be bound by theory the inventors believe that the inclusion of at least one protrusion 6 on the barrel and/or the cap provides at least one point of contact between the barrel and cap and provides a localised contact area for an ultrasonic weld between the body and the cap.

The cap 4 may be formed such that it is contiguous to the body 2 and comprises at least one protrusion.

In various embodiments the cap encapsulates the first end outlet of the device, the cap comprising at least one aperture, and in some embodiments at least one variable geometry device dependent from the body to assist rumen retention, or both.

In some embodiments there may be at least one protrusion 6 located in the attachment zone and therefore at least one point of contact between the barrel 2 and the cap 4. Preferably, at least protrusion 6 is located on the inner surface of the cap 4.

Optionally, at least one protrusion 6 is located on the outer surface of the first end of the barrel 2. Optionally, a snap fit projection 5 on the outer surface of the first end of the barrel 2 is a protrusion providing a localised contact area for an ultrasonic weld between the body and the cap.

In some embodiments there may be more than one protrusion 6 providing more than one point of contact between the body and one or more external elements, for example 1, 2, 3, 4, 5, 6, 7, 8, 9, 10, 11, 12, 13, 14, 15, 16, 17, 18, 19, 20 or more protrusions providing 1, 2, 3, 4, 5, 6, 7, 8, 9, 10, 11, 12, 13, 14, 15, 16, 17, 18, 19, 20 or more points of contact respectively and suitable ranges may be selected from any of these values (for example from 1 to 20, 1 to 10, or 1 to 5 protrusions and points of contact).

In some embodiments the protrusion is continuous around the perimeter of the barrel at the attachment zone, for example, around the inside of the end cap and/or around the outside of the body or vice versa.

In some embodiments the at least one protrusion may be discontinuous around the perimeter of the body or of the external element.

In some embodiments there may be a plurality of protrusions on the body and/or one or more external elements, and the plurality of protrusions may be provided in a spaced configuration or adjacent to each other.

In some embodiments at least one protrusion may have a triangular cross-section.

In some embodiments at least one protrusion may have a trapezoid cross-section.

In various embodiments at least one protrusion on the barrel mates with a substantially flat surface of the cap, or vice versa.

In various embodiments at least one protrusion on the body mates with a surface of at least one external element comprising a complementary indentation.

Optionally as shown in FIG. 3, the inner surface of the cap 4 in communication with the opening at the first end of the barrel 2, comprises a barrier projection 17. The barrier projection 17 on the inner surface of the cap 4 preferably limits ruminal fluid and/or fluid of the tablet from flowing along the under-surface of the cap. Limiting the flow of liquids along the under-surface of the cap may be advantageous to protect the bond between the cap 4 and the barrel 2. The barrier projection 17 may reduce separation of the cap from the barrel within the rumen and after regurgitation.

In some embodiments, the cap may be made of the same material as the body or a different material. In various embodiments the cap is made of a polymeric material that is stable under the conditions present in the rumen of the animal. For example, the end cap may be made of polypropylene or a co-polymer of polypropylene.

3. Weld Attachment Zone

As shown in FIG. 2, the intra-ruminal device 1 comprises an attachment zone B towards the first end of the barrel 2, and the cap 4. At the attachment zone B, at least a portion of the inner surface of the cap 4 sidewall is in contact with the outer wall surface of the barrel 2.

Preferably, at the attachment zone, the barrel 2 comprises a width less than the flared end of the barrel 2. Preferably, when the cap 4 is fixed onto the first end of the barrel, the outer surface of the barrel and the cap is smooth and continuous, as shown in zone B of FIG. 2.

As best shown in FIG. 3, in the preferred configurations prior to heat being applied to the attachment zone, in a pre-weld condition, located within the attachment zone is at least one protrusion 6. Protrusions 6 provide a localised point of contact between the outer barrel wall 2 and the internal sidewall of the cap 4.

In the preferred configuration as shown in FIG. 3, at least one protrusion 6 comprises a triangular cross-section. Preferably, the apex of at least one protrusion 6 contacts the outer barrel wall 2. Preferably, the apex of at least one protrusion 6, points towards the second end of the barrel. Optionally, the apex of at least one protrusion 6, points towards the first end of the barrel.

Preferably, in the pre-welded condition as shown in FIG. 3, the height of the cap 4 in its pre-welded condition, including the protrusions 6, is greater than the height of the attachment zone of the barrel 2.

In the preferred configurations, the attachment zone comprises at least one corresponding weld void or cavity 16 adjacent to each protrusion 6 prior to welding. The weld cavities 16 are configured to capture melted material from a corresponding protrusion 6. Preferably, the volume of the weld cavities 16 is of the same or greater than the volume of the corresponding protrusion 6. Preferably, the weld cavities 16 are at least partially filled by plastic melted from the corresponding protrusion 6 in a fixed condition.

4. Method of Assembling Intra-Ruminal Device

In one embodiment the method of assembling an intra-ruminal device as described above includes first loading the active agent into the barrel. The cap is then located over the opening at the first end. The attachment zones are then subjected to ultrasonic vibrations to produce frictional heat energy at the protrusions to form a weld between the protrusion at its contact surface.

Preferably the cap is forced onto the barrel as the welding takes place so that the cap forms a tight seal against the end of the barrel.

Preferably, to assemble the intra-ruminal device 1, the device transforms from a pre-weld condition as shown in FIG. 3, to an intermediate condition as the protrusions begin to melt, to a fixed condition where the protrusions have melted and the base of the cap 19 is pushed up against the end of the barrel 20.

Preferably the cap and barrel include a snap fit projection shown as item 5 (and the corresponding thickening of the terminal portion of the cap 21) in FIG. 3. That is, the cap is pushed onto the end of the barrel until the terminal thickening of the cap 21 snaps over the snap fit projection 5. This enables the cap to be held loosely on the end of the barrel awaiting welding and fitting.

Pre-Weld Condition/Interference Fit

As shown in FIG. 3, preferably the pre-weld condition provides an interference fit where the cap cannot be pushed against the end of the barrel.

Preferably, the cap 4 is attached to the first end of the barrel 2 by friction after the parts are pushed together. Preferably, to attach the cap 4 onto the first end of the barrel 2, a force is applied to the cap 4, to push it towards the second end of the barrel. Preferably, a machine applies a force on the outer surface of the cap 4 towards the second end of the barrel 2. Optionally, manual force using suitable equipment known to the art can be used to apply the necessary force to fit the cap 4 over the first end of the barrel 2.

To prevent the cap 4 from disconnecting, a projection 5 on the barrel or cap is held against a corresponding surface or projection 21 by friction. Preferably, in an attached pre-weld condition, the cap 4 is loosely fitted onto the first end of the barrel 2. Preferably, the cap 4 can only be removed from the barrel 2 if sufficient force is applied onto the cap in a direction towards first end of the barrel.

Preferably, in the pre-welded condition, the height of the cap 4 in its pre-welded condition, including the protrusions 6, is greater than the height of the attachment zone of the barrel 2. Preferably, in the pre-weld condition, the inner surface of the top of the cap 4, is not on the same plane as the opening at the first end of the barrel 2.

Intermediate Condition/Welding

Preferably, to transform the intra-ruminal device 1 from a pre-weld condition, to a fixed condition, the cap 4 is ultrasonically welded to the first end of the barrel 2. Ultrasonic welding as a method of fixing the cap 4 to the barrel 2 is advantageous as the method may improve efficiency, economy, and speed of adjoining the parts together.

To ultrasonically weld the cap 4 to the barrel 2, heat is generated by a welder by friction via vibrations. In the preferred configurations, to ultrasonically weld the cap 4 to the barrel 2, the welder is applied onto the outer surface of the cap. Preferably, the vibrational energy from the welder is applied substantially on the same plane or area as the protrusion 6.

In one configuration, the weld is at the distal end of the cap 4. In another configuration, the weld is at the proximal end of the cap 4. In the preferred configuration, the weld is at both the distal end and the proximal end of the cap 4. Optionally, the weld is between the proximal end and distal end of the cap 4.

Preferably sufficient heat is generated to substantially melt the protrusions 6 in the attachment zone, between the barrel and the sidewall of the cap 2. In the preferred configuration, pressure is applied to compress the barrel and cap together to increase bonding.

The heat generated from vibrations is directed to localised points of contact between the barrel and the cap. Preferably, the localised points of contacts being the protrusions 6 that extend from one surface to contact the other surface.

Preferably, the heat generated from the vibration and friction between the protrusion 6 and a corresponding surface, substantially melts the protrusion. The melted plastic from the protrusion 6, preferably flows and at least partially fills the corresponding welding cavity 16 in an intermediate condition. Preferably, the distance between inner surface of the cap 4, and the outer surface of the barrel 2 decreases from the pre-weld condition to the intermediate condition. Preferably, as the protrusion 6 are melted, the cap 4 displaces in a direction towards the second end of barrel.

Preferably the cylinder pressure of the ultrasonic welding is 3 bar.

Preferably the stroke of the ultrasonic welding is 1 mm proximal from the outlet.

Preferably the weld time of the ultrasonic welding is about 0.32 seconds.

Preferably the hold time of the ultrasonic welding is 1 second.

Preferably the delay time before the ultrasonic vibration starts is about 0.5 seconds.

Preferably the amplitude of vibration of the ultrasonic welding is 8.

The parameters used for ultrasonic welding may tailored to effectively weld caps and device bodies comprising, for example, protrusions of different sizes.

In some embodiments the cylinder pressure used for ultrasonic welding may be from about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 27, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5 bar or more, and useful ranges may be selected from any of these values (for example from about 0.5 to about 5, from about 1 to about 4, or from about 2 to about 3 bar).

In some embodiments the cylinder flow, the velocity of the cylinder as it travels towards the components may be from about 5, 10, 15, 20, 25, 30, 35, 40, 45, 50, 55, 60, 65, 70, 75, 80, 85, 90, 95, or 100% and useful ranges may be selected from any of these values (for example from about 5 to about 100%, from about 10 to about 60%, or from about 40 to about 60%).

In some embodiments the distance that the cylinder travels to press the components together (stroke) may be from about 0.5, 1, 2, 3, 4, 5, 10, 15, 20, 25, 30, 35, 40, 45, 50, 55, 60, 65, 70, 75, 80, 85, 90, 95 or 100 mm or more, and useful ranges may be selected from any of these values (for example from about 0.5 to about 100 m, from about 1 to about 80 mm, from about 1 to about 70 mm).

In some embodiments the weld time, hold time—the duration that the components are held together after the weld has been completed—may be from about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2.0, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95 or 3 seconds or more and useful ranges may be selected from any of these values (for example from about 0.1 to about 3, from about 0.1 to about 2, or from about 0.1 to about 1 second).

In some embodiments the trigger—the delay time before the ultrasonic vibration starts—may be from about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, or 2.0 seconds or more and useful ranges may be selected from any of these values (for example from about 0.1 to about 2, from about 0.1 to about 2, or from about 0.1 to about 0.75 seconds).

In some embodiments the amplitude of the vibration may be from about 1, 2, 3, 4, 5, 6, 7, 8, 9, 10, 11, 12, 13, 14, 15 or more and useful ranges may be selected from any of these values (for example from about 1 to about 15, from about 5 to about 15, or from about 5 to about 10).

In the preferred embodiment, a rod forces the matrix of active agents towards the second end of the barrel 2, away from the welding zone, during the welding process. Preferably, the machine which applies a force on the cap 4 towards the second end of the barrel, simultaneously pushes the matrix of tablets in the same direction. Optionally, a separate mechanism forces the matrix of active agents towards the second end of the barrel 2.

An advantage of pushing the matrix of tablets towards the second end of the barrel is to prevent heat damage to the internal components of the intra-ruminal device 1, during the welding phase.

Fixed Condition

Following, the ultrasonic welding phase, the intra-ruminal device 1 undergoes a cooling phase wherein the barrel 2 and cap 4 are cooled following ultrasonic welding to create a solid state weld. Preferably, once the weld has cooled, the cap 4 and barrel 2 are fused together in a fixed condition. Preferably, in the fixed condition, the inner surface of the top of the cap 4, is on the same plane as the opening at the first end of the barrel 2. The ultrasonically welded caps 4, show reduced separation of device components within the rumen and after regurgitation.

Although the invention has been described by way of example and with reference to particular embodiments, it is to be understood that modifications and/or improvements may be made without departing from the scope or spirit of the invention.

The present invention will be further illustrated in the following examples which are given for illustration purposes only and are not intended to limit the invention in any way.

EXAMPLES

Example 1

This example demonstrates the effect of modifying the cap protrusions.

Caps as shown in FIG. 3 were prepared. These caps comprise a thickened and blended wall section below the retention bead compared to test caps 1.

Intra-ruminal device bodies were constructed out of Bormed BE860MO resin and the intra-ruminal device bodies were ultrasonically welded to either the cap of FIG. 3 or test cap 1, both made of EP274P resin.

When the weld parameters of Table 2 were used some splitting was observed for test cap 1 but not the caps of FIG. 3.

Increasing the weld time to 0.34 s also resulted in successfully welded devices comprising the caps of FIG. 3 made of EP274P resin.

TABLE 10

Weld Appearance Results - Weld Setting No - 2, Barrel v.1 and Orifice v.3.

| Code | QC-0469 | QC-0475 | QC-0475 |
|---|---|---|---|
| Material | EP2704 | EP274P | EP274P |
| Orifice Size | 18.5 mm | 18.5 mm | 18.5 mm |
| Weld Time | 0.32 s | 0.32 s | 0.34 s |
| Observations | split | no split/weld complete | no split/weld complete |
| | split | no split/weld complete | no split/weld complete |
| | split | no split/weld complete | no split/weld complete |
| | split | no split/weld complete | no split/weld complete |
| | split | no split/weld complete | no split/weld complete |
| | split | no split/weld complete | no split/weld complete |
| | split | no split/weld complete | no split/weld complete |
| | split | no split/weld complete | no split/weld complete |
| | split | no split/weld complete | no split/weld complete |
| | split | no split/weld complete | no split/weld complete |

Leak Test

Five empty welded devices comprising the caps of FIG. 3 formed using the weld parameters of Table 2 underwent leak tests by submerging the welded devices in a dye solution contained in a pressure vessel.

A 30 kPa vacuum was pulled for 30 seconds, after which time the capsules were removed from the pressure vessel and examined for signs of dye-incursion.

All devices passed the leak test.

Crush Test

Ten empty welded devices comprising the caps of FIG. 3 formed using the parameters of Table 2 were crushed in a vice to 5 mm. No cracks were observed in any of the devices which all remained intact.

Appearance

All devices comprising the caps of FIG. 3 (both empty and full of tablets) welded using the settings described in Table 2 had an acceptable weld appearance in that the weld joint was closed with no splitting.

Example 2

This example provides an example of welding configuration settings for ultrasonically welding a cap to the first end of the barrel of an intraruminal device.

Optionally, an ADG20 generator is used for an Ultrasonic Welder U149. The tables below provides an example of parameters which can be used.

Welding Parameters

| Welding Mode | Energy mode |
|---|---|
| Throttle | From 3.5 to 7.0 |
| Amplitude (40-100% intern. | From 95 to 100% |
| Gain 1.5 × 2.0 | 27.00 um |
| Trigger (Pressure) | 0.6 |
| Welding Energy | 310.0 Ws |
| Hold Time | 600 ms |

Example 3

This example provides a preferred configuration for the different physical characteristics of the different zones 7, 8, 9 of the resilient wing 3 design. Preferably the different zones of the resilient wing 3 comprises different flexibility characteristics. An advantage of the varying flexibility of the wing zones, is to provide the desired flexibility and strength properties at different zones of the wings 3. Preferably the wings 3 are separated into a first zone 7, a second zone 8, and a flexible zone 9.

Preferably, the capsules in this configuration comprises either Bormed or Sabic.

A peak force of 350-550 g was required to bend the flexible zone 9 and displace it by approximately 5 mm. A peak force of 1600-2600 g was required to bend the second zone 8 and displace it by approximately 5 mm. A peak force of 3500-5000 g was required to bend the second zone 8 and displace it by approximately 5 mm.

To test the wing 3 characteristics, the wings were cut to obtain the 3 zones of interest: a first zone 7, a second zone 8, and a flexible zone 9.

A TA.XTplus Texture analyser was used with a 2 mm cylindrical probe to determine the physical properties of the samples. For each test, the wing section was securely clamped at one end. The tests were ran in compression mode with a test speed of 1 mm/sec so that the cylindrical probe displaced the sample by approximately 5 mm (trigger force=25 g). Three replicates were performed for each sample.

The Table below provides wing characterisation data of the peak force (g) required to displace different zones of the wings 3 by approximately 5 mm.

| Capsule | | Peak Force (g) Mean ± St. Dev; N = 3 | |
|---|---|---|---|
| Size | Polymer | Zone 7 | Zone 8 |
| NTC | Bormed | 4881 ± 134 | 2154 ± 161 |
| NTC | Sabic | 5097 ± 161 | 2597 ± 76 |
| VYC | Bormed | 3488 ± 62 | 1606 ± 40 |
| VYC | Sabic | 3650 ± 90 | 1816 ± 59 |

The invention claimed is:

1. An intra-ruminal device, comprising:
a body substantially impervious to rumen fluids, the body defining a barrel having a first end and a second end, and an opening at the first end,
at least one variable geometry device connected to and extending from the body to assist rumen retention,
a dose of an active agent within the body to be accessible to rumen fluid via the first end,
a biasing arrangement within the body adapted to bias a plunger against the active agent in the body towards the first end, and
a cap having a sidewall and top, the cap located over the opening at the first end and comprising an outlet in the top;
wherein the sidewall overlaps a portion of the barrel to define an attachment zone, and located within the attachment zone are one or more protrusions and one or more corresponding weld cavities, the one or more protrusions providing a localised point of contact between an outer wall of the barrel and an internal portion of the sidewall of the cap to provide for an ultrasonic weld between the barrel and the cap at the attachment zone, wherein at least one of the one or more corresponding weld cavities comprises a void area formed between an inner surface of the cap side wall and the outer wall of the barrel in the attachment zone.

2. A device of claim 1, wherein a plurality of protrusions are provided adjacent to the opening, and the plurality of protrusions are in the same plane.

3. A device of claim 1, wherein a plurality of protrusions are provided in the attachment zone, and the plurality of protrusions are in different, yet adjacent, planes.

4. A device of claim 1 wherein a plurality of protrusions are provided, and the plurality of protrusions are formed about a perimeter of the attachment zone.

5. A device of claim 1, wherein a plurality of protrusions are provided, and the plurality of protrusions are located on an outer surface of the barrel in the attachment zone.

6. A device of claim 1 wherein a portion of the inner surface of the cap sidewall comprises a notch, into which extends a protrusion from the outer wall of the barrel to contact the surface of the notch.

7. A device of claim 1, wherein the thickness of the barrel wall adjacent the attachment zone is thickened relative to the remainder of the barrel wall to form a thickened barrel wall.

8. A device of claim 7, wherein the thickened barrel wall substantially matches the combined thickness provided by the cap sidewall and the barrel thickness at the attachment zone.

9. A device of claim 1, wherein the one or more protrusions contacts with a substantially flat surface of the corresponding wall surface.

10. A device of claim 1 wherein a plurality of protrusions are provided, and the protrusions are located on the inner surface of the cap side wall.

11. A device of claim 1 wherein a plurality of protrusions are provided, and the protrusions are located on the internal portion of the sidewall of the cap and on the outer surface of the barrel in the attachment zone.

12. A device of claim 1 wherein the one or more corresponding weld cavities are adjacent to corresponding protrusions, the one or more weld cavities configured to capture melted material from the corresponding protrusions.

13. A device of claim 12 wherein the volume of the at least one weld cavity is the same or greater than the volume of the corresponding protrusion.

14. A device of claim 12, wherein the void area is adjacent to a snap fit projection, and the void area is configured to capture melted material from the snap fit projection when the snap fit projection is subjected to ultrasonic vibrations that produce frictional heat energy at the snap fit projection.

15. A method of assembling an intra-ruminal device, the method comprising:
providing an intra-ruminal device comprising:
a body substantially impervious to rumen fluids, the body defining a barrel having a first end and a second end, and an opening at the first end,
at least one variable geometry device connected to and extending from the body to assist rumen retention,
a dose of an active agent within the body to be accessible to rumen fluid via the first end, and
a biasing arrangement within the body adapted to bias the active agent in the body towards the first end;
loading the active agent into the barrel;
attaching a cap located over the opening at the first end, the cap comprising an outlet in the top and having sidewalls that overlap a portion of the barrel to define an attachment zone, and located within the attachment zone is one or more protrusions and one or more corresponding weld cavities providing a localised point of contact between an outer wall of the barrel wall and an internal portion of the sidewall of the cap, wherein at least one of the one or more corresponding weld cavities comprises a void area formed between an inner surface of the cap side wall and the outer wall of the barrel in the attachment zone; and
subjecting the attachment zone to ultrasonic vibrations to produce frictional heat energy at the one or more protrusions to substantially melt the one or more protrusions to form a weld between the one or more protrusions at at least one localised point of contact.

16. A method of claim 15, wherein a primary direction of the ultrasonic vibrations is substantially perpendicular to the cap sidewall.

17. A method of claim 15 wherein subjecting the attachment zone to ultrasonic vibrations comprises holding the body and the cap together under heat and pressure.

18. An intra-ruminal device, comprising:
a body substantially impervious to rumen fluids, the body defining a barrel having a first end and a second end, and an opening at the first end,
at least one variable geometry device connected to and extending from the body to assist rumen retention, a dose of an active agent within the body to be accessible to rumen fluid via the first end,
a biasing arrangement within the body adapted to bias a plunger against the active agent in the body towards the first end, and
a cap having a sidewall and top, the cap located over the opening at the first end and comprising an outlet in the top;
wherein the sidewall overlaps a portion of the barrel to define an attachment zone, and located within the attachment zone is at least one protrusion that contacts with a substantially flat surface of the corresponding wall surface, the at least one protrusion providing a localised point of contact between an outer wall of the barrel and an internal portion of the sidewall of the cap to provide for an ultrasonic weld between the barrel and the cap at the attachment zone, wherein at least one of the at least one protrusions includes a corresponding weld cavity comprising a void area formed between an inner surface of the cap side wall and the outer wall of the barrel in the attachment zone.

19. The device of claim 18, wherein the void area is configured to capture melted material from the protrusion when the protrusion is subjected to ultrasonic vibrations that produce frictional heat energy at the protrusion.

20. The device of claim 18, wherein the weld cavity is configured so that it is at least partially filled by plastic melted from a corresponding protrusion in a fixed condition.

* * * * *